Figure 8:
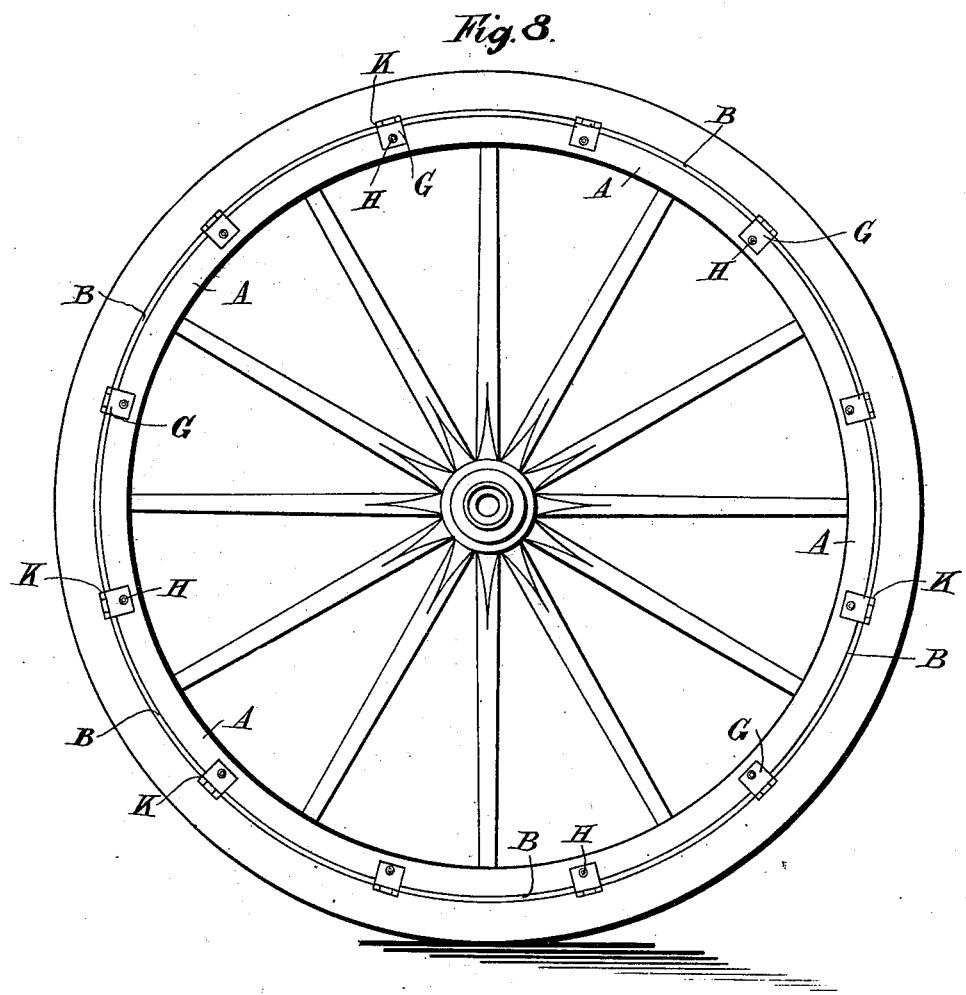

No. 656,060. Patented Aug. 14, 1900.
F. J. TRENCH.
MEANS FOR SECURING RESILIENT TIRES TO WHEELS.
(Application filed Feb. 12, 1900.)
(No Model.) 3 Sheets—Sheet 1.
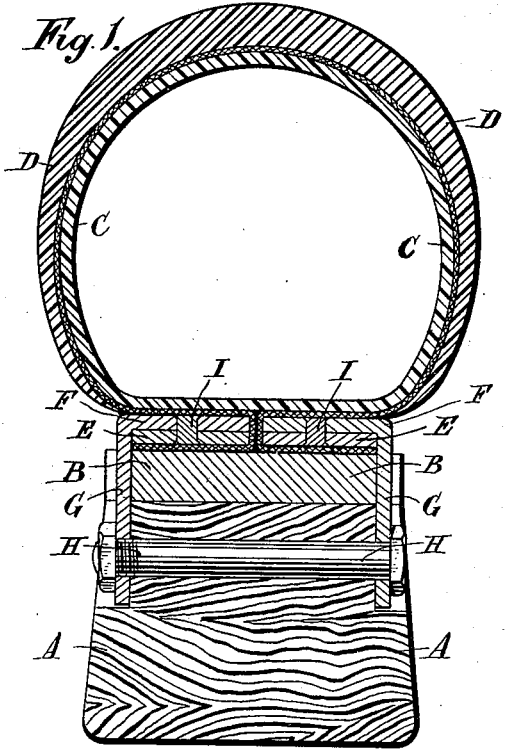
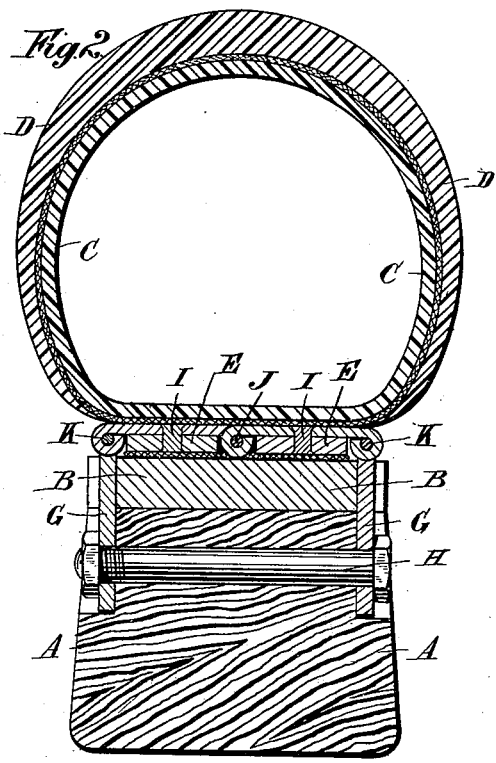
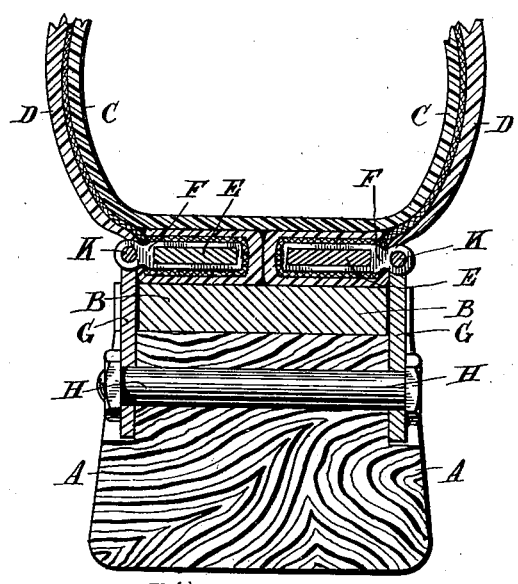
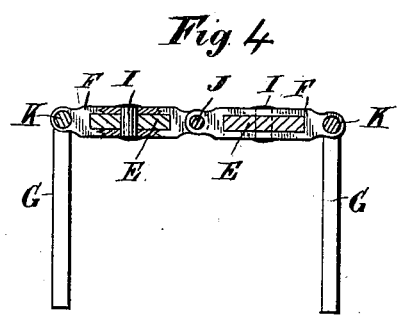
Witnesses
Inventor
Frederick J. Trench
by James L. Norris.
atty No. 656,060. Patented Aug. 14, 1900.
F. J. TRENCH.
MEANS FOR SECURING RESILIENT TIRES TO WHEELS.
(Application filed Feb. 12, 1900.)
(No Model.) 3 Sheets—Sheet 2.
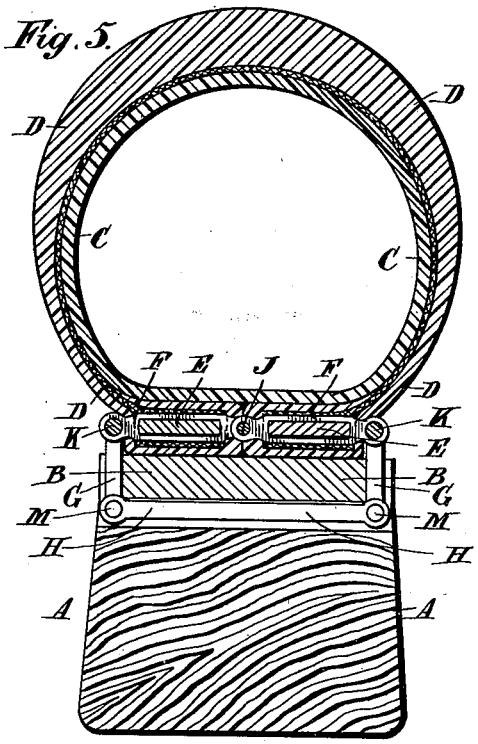
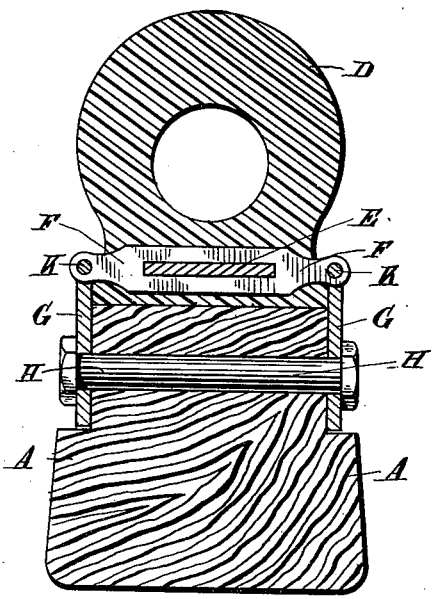
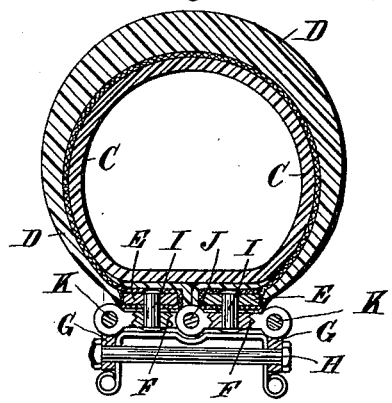
Witnesses
Inventor
Frederick J. Trench
by James L. Norris
atty No. 656,060. Patented Aug. 14, 1900.
F. J. TRENCH.
MEANS FOR SECURING RESILIENT TIRES TO WHEELS.
(Application filed Feb. 12, 1900.)
(No Model.) 3 Sheets—Sheet 3.

Witnesses
Inventor
Frederick J. Trench
by James L. Norris
Atty

UNITED STATES PATENT OFFICE.

FREDERICK JOHN TRENCH, OF DUBLIN, IRELAND.

MEANS FOR SECURING RESILIENT TIRES TO WHEELS.

SPECIFICATION forming part of Letters Patent No. 656,060, dated August 14, 1900.

Application filed February 12, 1900. Serial No. 4,984. (No model.)

*To all whom it may concern:*

Be it known that I, FREDERICK JOHN TRENCH, a subject of the Queen of Great Britain, residing at 58 Lower Mount Pleasant avenue, Rathmines, Dublin, Ireland, have invented certain new and useful Improvements in or Relating to Methods of Securing Resilient Tires on or to Road-Wheels, Pneumatic and Others, of which the following is a specification.

This invention has for its object securing tires or parts of tires on or to the wheels, according to the uses for which the wheels are made, such as for road, motor-cars, or like vehicles and cycles.

For the purpose of my invention I employ one or more flat or wavy bands, strips with overlap ends, plain, corrugated, or toothed, which ends may be free or be clipped, stamped, or otherwise secured together. The bands or strips carry single or double or hinged yoke-like appliances at a distance apart from each other, which yoke-like appliances may have plain or hinged side flaps capable of being bolted or otherwise secured to the felly or rim of the wheel. The yokes or fasteners may be screwed, riveted, or otherwise secured to the bands on either side or may be so made as to encircle the band, and in some cases may be also riveted thereto, the yokes and the band being secured in any suitable manner to the edges of the cover of, say, a pneumatic tire or may be embedded in a solid or cushion tire, but have their outer ends projecting therefrom for the flaps or hinged portion to be secured to the rim or felly of the wheel on the outside.

My invention will be clearly understood from the annexed drawings, in which—

Figure 1 is a section of a felly of a road-vehicle wheel having a pneumatic tire applied, the yokes being separate and riveted to the bands and having flaps at an angle thereto projecting down the side of the felly and fastened by bolts. Fig. 2 is a section of a pneumatic tire and felly of a road-vehicle wheel, the yokes being riveted to the bands and connected together in pairs by a hinge-joint, the flaps being also hinged to the yokes and secured to the felly by bolts. Fig. 3 is a section of a pneumatic tire and road-vehicle-wheel felly, the yokes encircling or embracing the bands and carrying the flaps by hinge-pins, the flaps being secured to the felly by bolts. Fig. 4 is a section of the bands having encircling yokes, the yokes being hinged together and secured to the bands by rivets. Fig. 5 is a section of a pneumatic-tired felly, the yokes encircling or embracing the bands and connected together by a hinge-pin, the flap in this case being hinged to one yoke and, encircling the iron rim of the wheel, is secured to the other yoke by a pin. Fig. 6 is a section of a cushion-tired felly in which only one band is used, the yoke encircling the band with its ends projecting from the tire and carrying hinged flaps for securing to the felly by a bolt. Fig. 7 is a section of a pneumatic-tired metal rim suitable for a cycle, the yokes being hinged together and riveted to the bands, the flaps being hinged to the yokes and secured to the rim by bolts. Fig. 8 is an elevation of a road-vehicle wheel, showing the approximate position the flaps occupy.

A is the felly of a wheel of a road-vehicle, having, as is usual, the iron band or rim B.

C is a pneumatic tube, and D the pneumatic-tube cover, having embedded in or secured to its edges the bands E. These bands E at intervals carry yokes F, which have either as part thereof, as in Fig. 1, or hinged thereto, as in the other figures, flaps G, which flaps project from the yokes F and tire-cover D and are capable of fitting or being folded down upon the sides of the felly A, to be secured to the felly by a bolt H or in any other suitable manner. In Figs. 1, 2, and 7 the yokes F are secured to the bands by rivets I; but at Figs. 3, 5, and 6 the yokes F are made with slots through which the bands E are passed, the yokes being retained in place by the ends being passed through slits in the cover or otherwise; but for extra security I may rivet the slotted yokes F to the bands E, as at Fig. 4.

In Fig. 1 the yokes F and flaps G are in one piece, the flaps G being at right angles to the yokes for fitting to the side of the felly A and be thereto connected by a bolt H passing through the felly.

In Fig. 2 the yokes F are hinged together at the center by a pin J, and the flaps G are hinged to the yokes by pins K, the method of fastening to the felly being the same as with Fig. 1.

In Fig. 3 the yokes F encircle the bands E, the bolt H for connecting the hinged flaps G passing through the felly; but the bolt H may be passed through a recess made between the felly A and rim or band B.

In Fig. 5 the bolt H is formed with eyes L at its ends, and corresponding eyes are formed on the hinged flaps, so that on passing the bolt H through a hole made between the felly A and rim or band B the hinged flaps G can be securely held by pins M being passed through the eyes of the bolt H and hinged flaps G.

In Fig. 6 a cushion-tire is shown as being secured to the wooden felly of a wheel, and in this case it is only necessary to use one band E, which is passed through slots in the yokes F, and these, with the band, being embedded in the tire, with the ends of the yokes projecting to carry by hinge-pins the flaps G, which are secured to the felly in the same manner as in Fig. 1.

In Fig. 7 I have shown my invention applied to a rim suitable for a cycle, the yokes in this case being riveted to the bands and carrying the hinged flaps for securing to the rim by a bolt, as in Fig. 1.

Various methods may be employed for securing the band and yokes to the edges of the tire-cover; but I prefer that the edges of the cover be wrapped around the bands and the whole secured together by cement or sewing, the flaps projecting from the cover for easy adaptation to the wheel.

It is understood that the yokes F and flaps G are only secured to the band at intervals, such as is seen in Fig. 8.

In all cases where the hinge-pins are employed the same may be of the split or other kind for easy removal.

What I claim, and desire to secure by Letters Patent, is—

1. In combination with the felly of a wheel, a rubber tire thereon having a band embedded therein and encircling the felly, and a series of yokes extending transversely through the tire at intervals and engaging over said band, each of said yokes having at its ends clips extending at right angles thereto and embracing the sides of the felly, and means for securing said clips to the felly, substantially as described.

2. In combination with the felly of a wheel, a rubber tire thereon, a series of yokes extending transversely through the tire at intervals, each of said yokes having an opening and being provided at its ends with clips embracing the sides of the felly, bolts extending through the clips and felly, and a band embedded in the tire and passed through the openings in said yokes, substantially as described.

3. In combination with the felly of a wheel, a rubber tire thereon having a band embedded therein and encircling the felly, and a series of yokes extending transversely through the tire at intervals and engaging over said band, each of said yokes having at its ends clips hinged thereto and embracing the sides of the felly, and bolts extending through said clips and felly, substantially as described.

4. In combination with the felly of a wheel, a rubber tire thereon, a series of yokes extending transversely through the tire at intervals, each of said yokes comprising two hinged sections each of which is provided with an opening, a pair of bands embedded in the tire and passing through the openings in said yokes, clips hinged to the ends of said yokes and embracing the sides of the felly, and bolts passed through said clips and felly, substantially as described.

In testimony whereof I have hereunto set my hand in presence of two subscribing witnesses.

FREDERICK JOHN TRENCH.

Witnesses:
 JAMES O'NEILL,
 FRANCIS W. SCOTT.